United States Patent [19]

Pearce et al.

[11] Patent Number: 4,733,378

[45] Date of Patent: Mar. 22, 1988

[54] ACTIVE LOW-PROFILE HYDROPHONE

[75] Inventors: Richard Pearce; Richard Marschall; James Brown, all of Houston, Tex.

[73] Assignee: Western Atlas International, Inc., Houston, Tex.

[21] Appl. No.: 871,329

[22] Filed: Jun. 6, 1986

[51] Int. Cl.⁴ .......................... G01V 1/38

[52] U.S. Cl. .......................... 367/17; 181/110; 367/188; 367/177

[58] Field of Search .......................... 367/15-17, 367/106, 136, 165, 173, 177, 130; 181/110; 114/244

[56] References Cited

U.S. PATENT DOCUMENTS

| | | | |
|---|---|---|---|
| 1,391,681 | 9/1921 | Hahneman et al. | 181/140 |
| 1,482,980 | 2/1924 | Fay | 367/16 |
| 1,625,245 | 4/1927 | Dorsey | 367/130 |
| 2,022,038 | 11/1935 | Hecht | 181/140 |
| 2,423,591 | 7/1947 | Flude | 367/16 |
| 2,551,417 | 5/1951 | Carlisle | 367/177 |
| 3,212,600 | 10/1965 | Hensley | 367/15 |
| 3,561,268 | 1/1969 | Massa | 367/130 |
| 3,921,755 | 11/1975 | Thigpen | 367/177 |
| 3,961,303 | 6/1976 | Partson | 367/12 |
| 4,334,296 | 6/1982 | Hall | 367/177 |
| 4,463,451 | 7/1984 | Warmack et al. | 367/16 |

OTHER PUBLICATIONS

Baggeroer et al, "DATS-A Digital . . . Comm.", 9/18/81, pp. 55-60, IEEE Conf., Boston, Mass.

Steinmetz et al, "Soil Coupling . . . Seismometer", 5/3/79, pp. 2235-2250, OTC.

Buch et al, "A Two-Hydrophone . . . Noise Levels", 11/80, pp. 1306-1308, J. Acoust. Soc. Amer., vol. 68, No. 5 (abst).

Abbagnaro et al, "Measurements of . . . Hydrophones", 6/79, pp. 1407-1412, J. Acoust. Soc. Amer., vol. 65, No. 6 (abst).

*Primary Examiner*—Nelson Moskowitz
*Attorney, Agent, or Firm*—Barry C. Kane

[57] ABSTRACT

An active, low-profile hydrophone for use in aquatic environments having substantially turbulent flow conditions. The hydrophone is generally pisciform such that it may lie substantially flat on the water bottom and oriented in the current so as to reduce ambient noise associated with the turbulent flow. The enclosed sensors are oriented such that they are insensitive to acceleration and are coupled to a unity gain amplifier network also contained within the hydrophone.

7 Claims, 8 Drawing Figures

Fig. 7
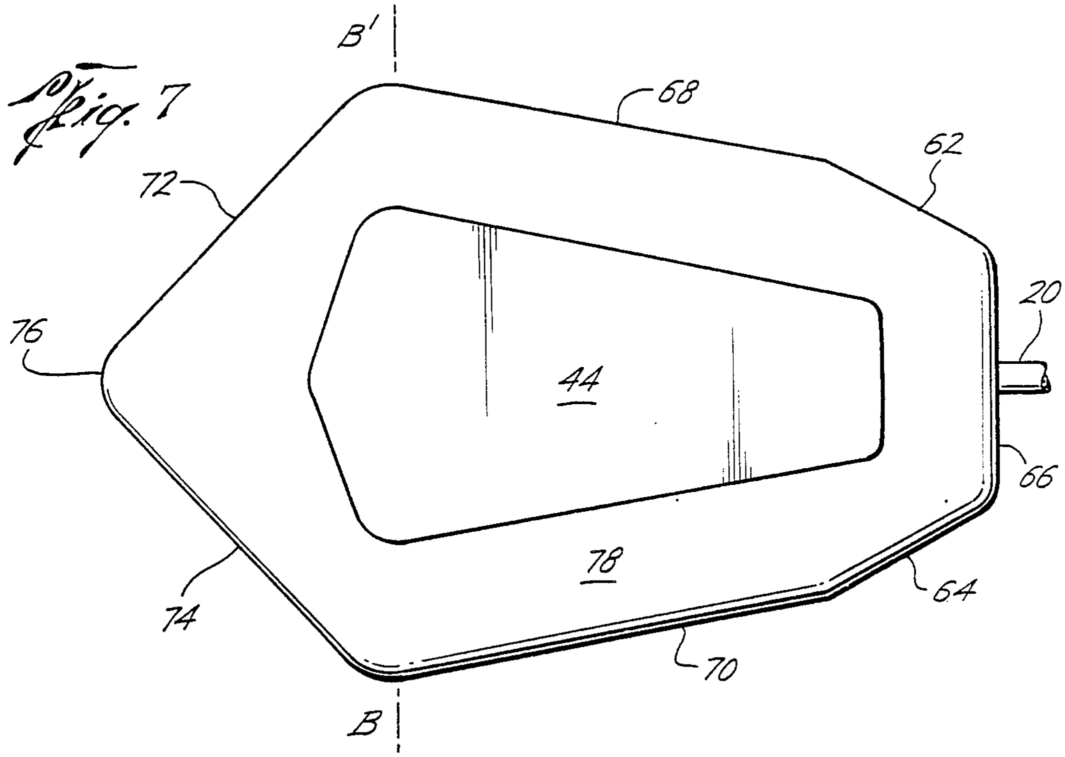
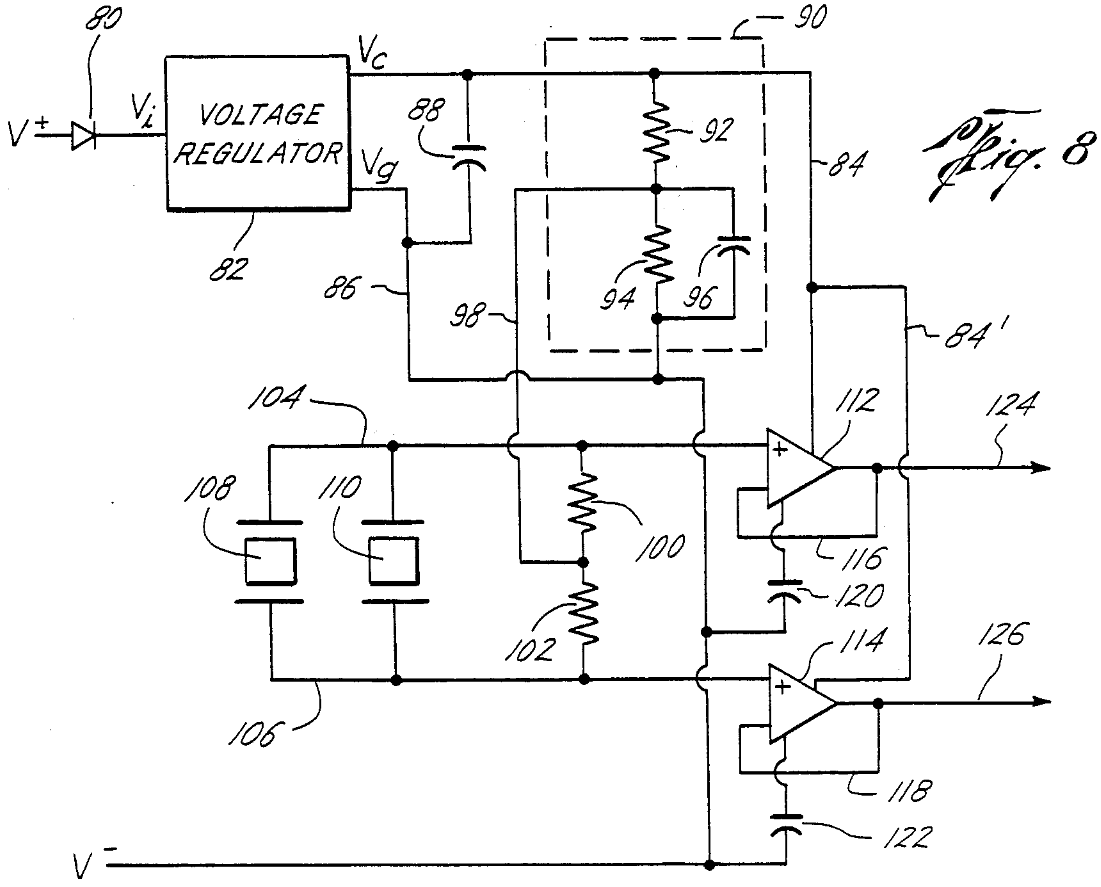
Fig. 8

ACTIVE LOW-PROFILE HYDROPHONE

BACKGROUND OF THE INVENTION

FIELD OF THE INVENTION

This invention relates to the field of seismic exploration and particularly to an active low-profile hydrophone for use in flowing aqueous environments.

BACKGROUND OF THE INVENTION

In seismic exploration of shallow water environments, a digital seismic exploration method was developed utilizing a plurality of self-contained buoys, each containing a battery-powered RF transceiver coupled to a hydrophone suspended in the water. Each buou is deployed at a particular point of interest in a grid above the surface of the earth. A remote seismic source is actuated generating acoustic waves which propagate downward into the earth. The downwardly propagating waves impinge upon rock types and sediments of different density and are reflected back to the earth's surface where the seismic signals are transformed to pressure waves in the water. The pressure waves impinge upon the hydrophones suspended in the water, where the pressure signals are detected and converted to electrical signals. The electrical signals are transmitted to the transceiver over a wire conductor where they are transmitted to a remote transceiver associated with a recording device. The buoy is often anchored so as to prevent drift. With the buoy substantially fixed in a flowing environment, the suspended hydrophone is carried about, flying so to speak in the current. The current flowing past the hydrophone creates much noise in the system caused by turbulence about the hydrophone casing. Substantially, all hyrophones currently used are cylindrical in the form. Although a cylindrical casing is preferred over a square casing, flow separation and turbulence often still occur.

SUMMARY OF THE INVENTION

It is one object of this invention to provide an active hydrophone for use in flowing aqueous environments.

It is another object of this invention to provide a hydrophone less susceptible to current noise.

It is yet another object of this invention to provide a hydrophone which provides laminar hydrodynamic flow.

It is still another object of this invention to provide a hydrophone which will assume a preferred orientation on the water bottom.

In one embodiment of the inventive hydrophone for use in flowing aqueous environments, a pisciform or fish-shaped housing encloses a weighted frame having an amplifier and power circuit board mounted thereon. Adjacent the circuit board and oriented perpendicular thereto in a vertical plane are a plurality of piezoelectric sensors operably coupled to the amplifier and power circuit board. A conductor cable having a plurality of conductors therein is anchored within the hydrophone casing to the frame with the conductors soldered to the appropriate locations of the circuit board.

When in use, it is preferred that the hydrophone lie on the water bottom. The external shape is such that the cable end of the hydrophone will be up current so that the current will flow up gradient over the hydrophone surface so as not to result in separation of the flow over the housing and less noise to the sensors. In conditions where the hydrophone is not lying on the bottom of the body of water, the hydrophone will vane into the direction of current flow. The external shape suspended in the water exposes two identical surfaces to the current resulting in non-separation of the flow over the housing.

BRIEF DESCRIPTION OF THE DRAWING FIGURES

A better understanding of the benefits and advantages of my invention may be obtained from the appended detailed description and the drawings, wherein:

FIG. 7 is a plan view of an alternate embodiment of this invention; and

FIG. 8 is a schematic diagram of the electronics circuitry of the hydrophone.

DETAILED DESCRIPTION OF THE PREFERRED EMBODIMENT

Figure 1:
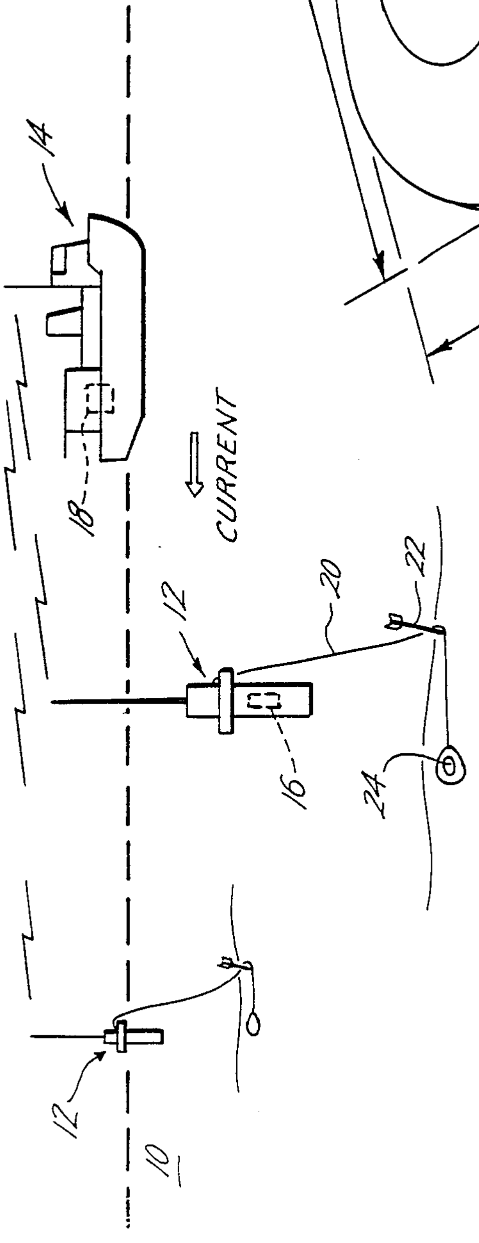
FIG. 1 is a generalized diagram illustrating a method for collecting seismic data in a shallow body of water using buoys interrogated by a radio signal.

FIG. 1 is a generalized diagram illustrating a method for collecting seismic data in a shallow body of water 10 such as a lake, bay, river or nearshore marine. A plurality of buoys generally indicated as 12 are deployed along the water surface at predetermined locations by a boat 14. Each buoy contains a RF transceiver 16 which is in intermittent communication with a remote recording device 18 that may be on the boat 14. Each buoy 12 is prevented from drifting from the assigned location by a cable 20 of predetermined length coupled to an anchor 22 lying on the water bottom. A seismic sensor 24 such as a hydrophone is disposed at the lower end of the cable 20 and operably connected to the RF transceiver by conductors contained in the cable. The water depth in these environments is generally less than 100 feet but occasionally may be as great as 300 feet.

Figure 2:
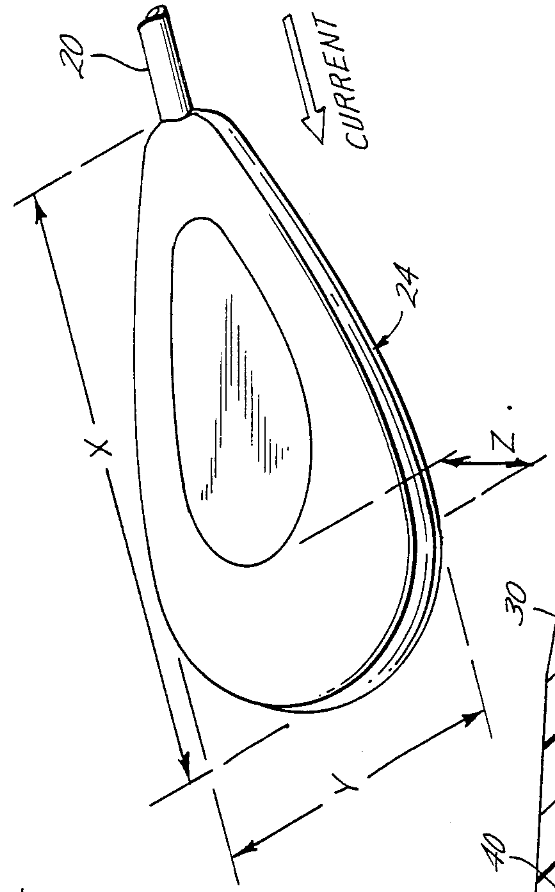
FIG. 2 is an isometric view of one embodiment of this invention.

FIG. 2 is an isometric view of one embodiment of the hydrophone 24 showing the general pisciform (fish form) shape in its preferred orientation on the water bottom. The hydrophone length (X) is greater than the width (Y) which is greater than the height (Z). The unequal length of the axes assist in orienting the hydrophone in the preferred orientation of the water bottom.

Figure 3:
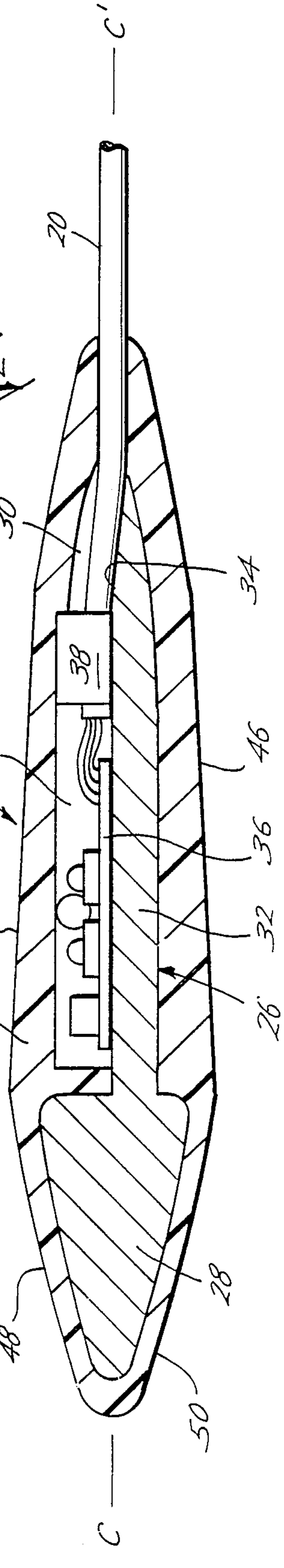
FIG. 3 is a side elevational view in cross section of the hydrophone shown in FIG. 2.
Figure 4:
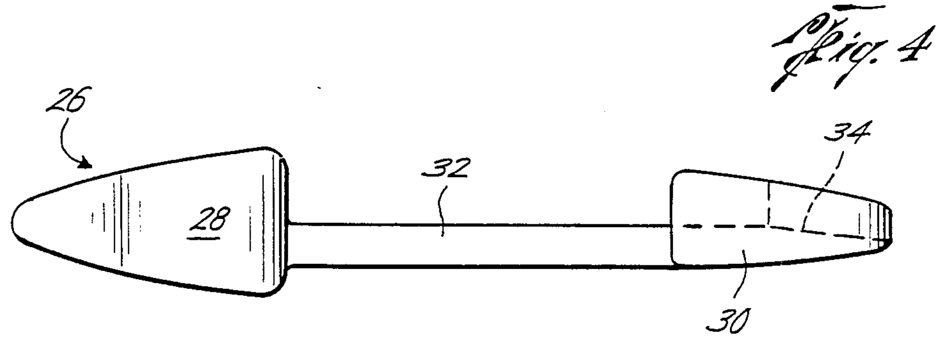
FIG. 4 is a side elevational view of the hydrophone frame.
Figure 5:
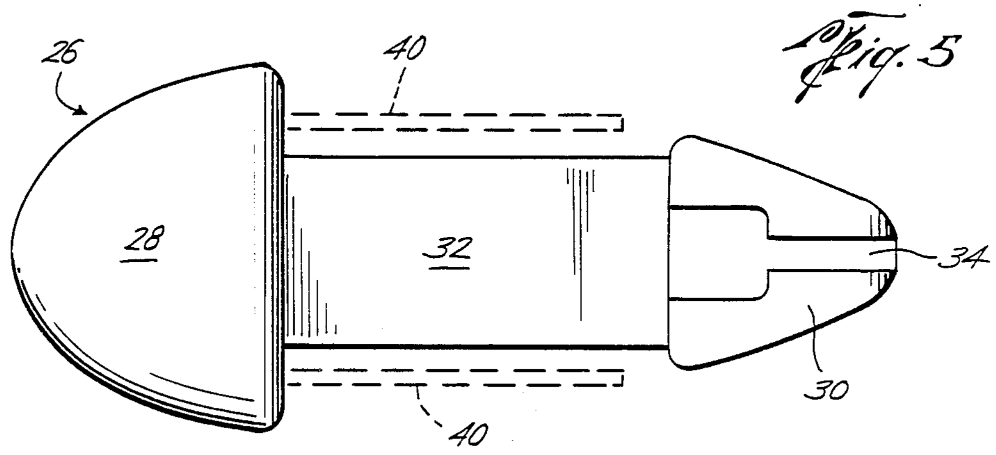
FIG. 5 is a plan view of the hydrophone frame.

FIG. 3 is a side elevational view in cross section showing the interior of the hydrophone 24. The foundation may be a frame 26 having a first end 28 and a second end 30 interconnected by a midplate 32. FIGS. 4 and 5 are side and plan views of the frame 26 where the first end 28 may be substantially larger in shape and size than the second end 30 with both being tapered towards the outer ends. A longitudinal channel 34 is contained in the second end 30. It is preferred that frame 26 be comprised of lead because of the density and ease of workability, however, any other suitable heavy material may be used such as steel or lead shot to achieve the preferred weight of approximately 3 pounds.

Returning to FIG. 3, a circuit board 36 containing an amplifier network is mounted to the midplate 32 of frame 26 between the first and second ends 28 and 30. The conductor cable 20 is received within channel 34 and held by cable anchor 38 where the enclosed conductors extend through the cable anchor and are soldered to the appropriate locations on the circuit board 36. The conductor cable 20 couples the hydrophone 24 to the RF transceiver or directly to a remote recording device such as 18 in FIG. 1. Details of the circuit board 36 are discussed below.

Mounted outboard of the circuit board 36 between the two ends 28 and 30 and oriented in a vertical plane parallel to the longitudinal axis are piezoelectric sensors generally indicated as 40. Each sensor 40 may comprise a piezoelectric disc sensor such as the LRS-2510 manufactured by Litton Resources Systems, P. O. Box 710, Alvin, Tex. 77512.

Completely enclosing frame 26, circuit board 36, cable anchor 38 and sensors 40 as well as a portion of cable 20, is a molded polyurethane plastic casing 42 having a shore "D" hardness substantially equal to 45. It is preferred that the polyurethane plastic casing 42 be made from a cold-pour polyurethane blend casting resin having a coefficient of elongation substantially equal to 450 percent and a tensile strength substantially equal to 2650 pounds per square inch.

The external shape of the polyurethane casing 42 is such that it is hydrodynamically stable under varying flow conditions. As seen in FIG. 3, it is preferred that the longitudinal cross section have external planar surfaces 44 and 46 forming a wedge gradually increasing from the frame second end 30, cresting at the junction of the frame first end 28 and midplate 32, where an opposing tapered wedge is defined by surfaces 48 and 50 about the frame first end 28.

Figure 6:
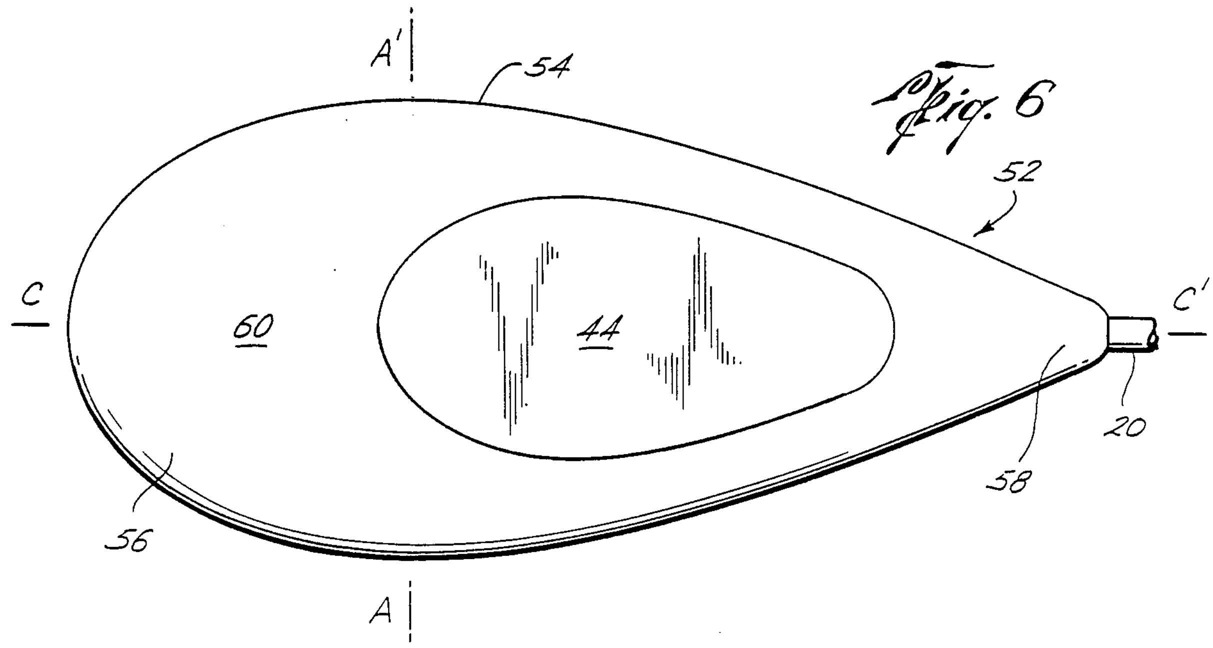
FIG. 6 is a plan view of the external shape of the hydrophone shown in FIG. 2.

FIG. 6 is a plan view of the preferred embodiment shown in FIG. 2, displaying a generally teardrop shape 52 having a gently curved perimeter 54, a rounded first end 56, and a narrow second end 58 which receives the conductor cable 20. The planar surfaces 44 and 46 form opposing positive inclined sides from the second end 58 to a crest at a point marked by the line A—A' marking the junction between the frame first end 28 and midplate 32 previously mentioned. From the line A—A' a tapered surface 60 provides a negative slope concentric with the rounded first end 56. Taper 60 continues between the planar surface such as 44 or 46 and the perimeter 54.

FIG. 7 displays another embodiment of the plan view of the hydrophone 24 having an irregular septagonal shape with sides 62 and 64 tapering outwards from an end 66 receiving the cable 20. The degree of taper decreases along sides 68 and 70 which extend along a substantial portion of the hydrophone perimeter to essentially a line B—B' marking the junction between the first end 28 and midplate 32 mentioned previously. From line B—B', sides 72 and 74 taper inwardly to converge in a rounded tip 76. One planar ramping surface such as 44 is shown by the central outline. The region generally shown as 78 is a taper between the planar surface 44 and the edges 62–76.

It is preferred that the three dimensional shape of the hydrophone have at least two planes of bilateral symmetry as shown in FIGS. 3 and 6. That is to say that the profile of the hydrophone on one side of a plane C—C' containing the longitudinal axis should be a mirror image of the other profile. FIGS. 3 and 6 show the plane C—C' extending into the page and displaying the mirror image of the hydrophone profile on each side of the plane.

FIG. 8 is a generalized schematic diagram of the integrated electronic circuitry employed in the hydrophone 24. The primary power is delivered through a pair of wires V+ and V− enclosed within the cable 20. In this discussion, wire V− is also referred to as ground.

The wire V+ is coupled in series to a reversal-protection diode 80 and to an input terminal $V_1$ of a voltage regulator 82. The voltage regulator 82 may output a constant regulated voltage out on output terminal $V_c$ and out over line 84. Another output terminal $V_g$ of the voltage regulator 82 may be coupled to the ground V− via line 86. A capacitor 88 having a capacitance substantially equal to 0.01 microfarads ($\mu$f) interconnects line 84 and output $V_g$ with ground.

Line 84 coupled to output terminal $V_c$ provides power to the bias-generating circuit 90 which includes a first and a second resistors 92 and 94 and each having a resistance essentially equal to 10,000 (10 k) ohms respectively, coupled in series to the ground V−. A capacitor 96 having a capacitance such as 10 $\mu$f may be coupled in parallel with resistor 94. The output from bias-generating circuit 90 originates between the series coupled resistors 92 and 94 and passes over line 98 to a pair of resistors 100 and 102 each having one end coupled thereto. The free ends of resistor 100 and 102 are connected to lines 104 and 106 respectively and each may have a resistance substantially equal to 500 k ohms.

At one end of lines 104 and 106, two piezoelectric sensing elements 108 and 110, such as the LRS-2510s mentioned previously, and having a capacitance substantially equal to 0.35 f each, are preferably coupled in parallel to each other and have a positive lead coupled to line 104 and a negative lead coupled to line 106. The opposite ends of lines 104 and 106 are connected to the non-inverting inputs of unity gain amplifiers 112 and 114. Amplifiers 112 and 114 each have an inverting input terminal connected via a feed back loop indicated as 116 and 118 respectively to the output terminal. Amplifiers 112 and 114 are coupled to ground V− by capacitors 120 and 122 respectively, each having a capacitance substantially equal to 0.001 $\mu$f. The output terminals of the amplifiers 112 and 114 are also connected to output lines 124 and 126 respectively, which return to another amplifier in the transceiver 16.

When power is applied to line V+, the voltage regulator 82 provides a regulated voltage to the bias-generating circuit 90 and to the two unity-gain amplifiers 112 and 114. The reversal-protection diode 88 prevents the components from burning out because of a polarity reversal. Capacitor 88 between lines 84 and 86 limits high-frequency noise produced by the voltage regulator.

The bias-generating circuit 90 produces a bias voltage approximately one-half that of the regulated voltage along line 84. Capacitor 96 filters the noise and signal-associated swings at the output junction between resistors 92 and 94 so as to produce a quiet, positive output bias voltage. The bias voltage is applied to the non-inverting inputs of the two amplifiers 112 and 114 so as to produce a positive reference output substantially equal to 7.5 v.

In operation, the pisciform hydrophone 24 is deployed on the water bottom. An anchor such as 22 shown in FIG. 1 is coupled to and near one end of a predetermined length of conductor cable 12, which rapidly pulls the hydrophone 24 to the water bottom where the anchor 22 embeds itself in the sediment. The hydrophone 24 coupled to the end of cable 12 settles to the water bottom under its own weight. The external shape of the hydrophone 24 assures that it will assume a flat-lying orientation on surface 44 or 46. The anchor 22 prevents the hydrophone from drifting, or being dragged along the water bottom in high flow rates.

In high flow rates (greater than 2 knots), the cable 12 and the hydrophone 24 may vane into the current from the anchor much in the same manner as a windsock vanes into the wind.

In a current flow situation capable of causing a hydrophone such as 24 to vane into the current, most often than not, turbulent flow conditions exist. It is well known that hydrophones detect greater amounts of ambient noise in turbulent flow conditions in contrast to laminar, lower flow conditions. The noise associated with turbulent flow is often the result of flow separation from the hydrophone exterior. That is not to say that cavitation occurs but that flow vectors do not conform exactly to the hydrophone exterior.

With hydrophone 24 oriented on the water bottom such that the second end 58 is upcurrent from the first end 56, the water flows up a positive gradient defined by planar surface 44 or 46, over the crest and down a negative gradient defined by tapered surface 48 or 50. Turbulent flow separation does not develop along the positive gradient because of the positive change in slope. Flow separation may occur downcurrent from the crest, but the noise generated thereby decays at a rate dictated by the equation $D=1/R^4$ where D is the distance down current from the crest and R is the radius of the crest. Because the sensing surface of the hydrophone lies between the second end 30 and the crest, less noise is introduced to the piezoelectric sensors by the less turbulent flow conditions along the positive gradient.

In situations where the length of cable 20 is insufficient to reach the water bottom, hydrophone 24 functions equally as well. The external shape is less susceptible to noise generated by turbulent flows. The hydrophone 24 may vane or fly into the current much in the same manner as before with the exception that both positive gradient surfaces 44 and 46 are exposed.

Pressure changes in the water surrounding the hydrophone 24 are transferred through the polyurethane blend housing to the piezoelectric sensing elements, causing a voltage to develop (either positive or negative, depending upon the direction of the pressure change) between the output leads. The voltage from the sensing elements are passed as input to the amplifiers which are output over lines 118 and 120.

Current flow upon the planar surfaces 44 or 46 does exert a force which is detected by the enclosed piezoelectric sensors; however, the change in signal response is easily compensated for in the processing of the data.

For illustrative purposes, my invention has been described with a certain degree of specificity. Variations will occur to those skilled in the art but which may be included within the scope and spirit of this invention which is limited only by the appended claims.

I claim as my invention:

1. A hydrophone having a low-profile housing for lying on the bottom of a turbulently flowing body of water to detect transient pressure signals propagating through the earth and to convert the transient pressure signals to amplified output signals indicative thereof passed over a conductor operably coupled to a transceiver for transmission to a remote recording device, said low-profile pisciform housing reducing ambient noise received by the sensing means by creating a positive positive pressure gradient along the housing exterior preventing said turbulently flowing body of water from separating from the housing.

2. A hydrophone asembly for use on the bottom of a substantially-rapid flowing body of water exhibiting a turbulent-flow condition, comprising:

(a) weighted frame;
(b) an acceleration-insensitive sensing means adjacent to said frame for detecting transient pressure pulses propagating through the earth and generating an output signal in response to the detected pressure pulses;
(c) means mounted to said frame and operably coupled to said sensing means for amplifying the output signal generated by said sensing means;
(d) a low-profile pisciform housing enclosing said frame, said sensing means, and said amplifying means, for substantially conforming to the bottom of said body of water and generating a positive pressure grading along the outside of said housing in a down-current direction creating a laminar flow condition adjacent thereto whereby said laminar flow condition produces less ambient noise than said turbulent flow;
(e) conductor means operably interconnecting said amplifying means to a remote recording device; and
(f) means for substantially maintaining the position of said hydrophone along the bottom of said body of water.

3. An active low-noise hydrophone for use on a bottom of a flowing body of water, comprising:

(a) a frame;
(b) sensing means adjacent said frame for detecting transient pressure signals propagating within said body of water and generating an output indicative thereof;
(c) means operably coupled to said sensing means and mounted on said frame for amplifying said output;
(d) means operably coupled to said amplifying means for transmitting said amplified output to a remote recording device; and
(e) a substantially solid pisciform housing surrounding said frame, said sensing means, said amplifying means, and a portion of said transmitting means, having at least two opposing wedge-planar surfaces, for lying on the bottom of said flowing body of water on one of said opposing surfaces so as to reduce ambient noise associated with said flowing body of water.

4. A hydrophone as recited in claim 2, wherein said acceleration-insenstive sensing means are piezoelectric discs disposed in a vertical plane adjacent said frame.

5. A hydrophone as recited in claim 4, wherein said amplifying means further comprises:

(a) a circuit board mounted to said frame;
(b) a voltage regulator mounted to said circuit board;
(c) a voltage divider coupled in parallel with said regulator;
(d) an impedance matching circuit coupled in series with said voltage divider;
(e) at least one piezoelectric sensor coupled in parallel with said impedance matching circuit; and
(f) a unity gain amplifier circuit operably coupled to said voltage regulator and coupled in parallel to said piezoelectric sensor and said impedance matching circuit.

6. A hydrophone as recited in claim 4 wherein said weighted frame comprises, a first end; a second end having a longitudinal channel therein and substantially smaller in size than said first end; and a midplate interconnecting said first and second ends.

7. A hydrophone as recited in claim 6 wherein said pisciform housing, comprises a cold pour polyurethane blend plastic molded about said frame, sensing means, and said amplifying means, said pisciform housing having a Shore "D" hardness between 40 and 50.

* * * * *

UNITED STATES PATENT AND TRADEMARK OFFICE
CERTIFICATE OF CORRECTION

PATENT NO. : 4,733,378

DATED : March 22,1988

INVENTOR(S) : Pearce, Richard; Richard Marschall and James Brown, all of Houston, Texas.

It is certified that error appears in the above—identified patent and that said Letters Patent is hereby corrected as shown below:

In the claims:

In column 5, line 68, insert a comma after "thereof";

In column 5, line 68, insert -- said output signals -- between "thereof," and "passed";

In column 6, line 4, delete the first occurrence of "positive"; and

In column 6, line 23, change "grading" to --gradient--.

Signed and Sealed this

Twenty-fifth Day of July, 1989

*Attest:*

DONALD J. QUIGG

*Attesting Officer*

*Commissioner of Patents and Trademarks*